US010498081B1

(12) United States Patent
Benner et al.

(10) Patent No.: US 10,498,081 B1
(45) Date of Patent: Dec. 3, 2019

(54) SELF-ALIGNING CONNECTOR FOR A LIGHT FIXTURE

(71) Applicant: CURRENT LIGHTING SOLUTIONS, LLC, East Cleveland, OH (US)

(72) Inventors: Kevin Jeffrey Benner, Solon, OH (US); Glenn Howard Kuenzler, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/246,662

(22) Filed: Jan. 14, 2019

(51) Int. Cl.
| | | |
|---|---|---|
| *H01R 13/631* | (2006.01) | |
| *H01R 33/97* | (2006.01) | |
| *H01R 33/06* | (2006.01) | |
| *H01R 33/945* | (2006.01) | |
| *F21V 17/12* | (2006.01) | |
| *F21V 23/06* | (2006.01) | |
| *F21S 8/08* | (2006.01) | |
| *F21W 111/02* | (2006.01) | |
| *B64C 39/02* | (2006.01) | |

(52) U.S. Cl.
CPC ............ *H01R 13/631* (2013.01); *F21S 8/086* (2013.01); *F21V 17/12* (2013.01); *F21V 23/06* (2013.01); *H01R 33/06* (2013.01); *H01R 33/945* (2013.01); *H01R 33/97* (2013.01); *B64C 39/024* (2013.01); *B64C 2201/12* (2013.01); *F21W 2111/02* (2013.01)

(58) Field of Classification Search
CPC .... H01R 13/631; H01R 33/06; H01R 33/945; H01R 33/97; F21W 2111/02; F21S 8/085; F21S 8/086; F21V 23/06
See application file for complete search history.

(56) References Cited

U.S. PATENT DOCUMENTS

| | | | | |
|---|---|---|---|---|
| 3,566,335 A | * | 2/1971 | Powell ................. | H01R 13/631 439/251 |
| 6,653,560 B1 | * | 11/2003 | Wu ......................... | F21V 23/06 174/135 |
| 9,423,110 B1 | * | 8/2016 | Newton .................... | F21S 8/00 |
| 9,815,197 B1 | | 11/2017 | Pickover et al. | |
| 9,948,029 B1 | * | 4/2018 | O'Neal, Jr. .......... | H01R 13/631 |

(Continued)

FOREIGN PATENT DOCUMENTS

WO    WO-2018204313 A1 * 11/2018    .............. F21S 8/086

*Primary Examiner* — Alexander K Garlen
(74) *Attorney, Agent, or Firm* — Buckley, Maschoff & Talwalkar, LLC (57) ABSTRACT

A self-aligning connector assembly for a light fixture. In some embodiments, the self-aligning connector assembly includes a base and a self-alignment component. The base includes a first alignment feature extending from a platform and a first electrical contact, and the self-alignment component includes a second alignment feature and a second electrical contact. When the self-alignment component is positioned over and then released onto the base, the first alignment feature mates with the second alignment feature which causes rotation of the self-alignment component under the force of gravity, resulting in operably connecting the first electrical contact to the second electrical contact.

17 Claims, 12 Drawing Sheets

(56) References Cited

U.S. PATENT DOCUMENTS

| | | | |
|---|---|---|---|
| 2002/0018344 A1* | 2/2002 | Sears, Jr. | H01R 29/00 |
| | | | 362/265 |
| 2009/0280673 A1* | 11/2009 | Kohen | F21V 21/002 |
| | | | 439/366 |
| 2018/0151974 A1* | 5/2018 | Feger | H01R 13/4532 |
| 2018/0316139 A1* | 11/2018 | Berrocal | H01R 13/631 |

\* cited by examiner

SELF-ALIGNING CONNECTOR FOR A LIGHT FIXTURE

FIELD OF THE INVENTION

The present disclosure generally relates to apparatus and methods for facilitating installation and/or replacement of an electronic device to a top portion of a light fixture. In an embodiment, a self-aligning connector includes a base including a first connection feature and a first electrical contact affixed to the top of a lamp head of an outdoor light fixture, and an alignment component having a second connection feature and a second electrical contact. In some implementations, when the light fixture is difficult to access, a flying drone positions the alignment component over the base such that the first alignment feature is over the second alignment feature. The flying drone then releases the alignment component such that the second alignment feature contacts or mates with the first alignment feature, which causes rotation of the alignment component under the force of gravity in a downward direction. The alignment component eventually comes to rest on a landing surface of a platform of the base wherein an electrical connection is formed between the first electrical contact of the base and the second electrical contact of the alignment component.

BACKGROUND

Figure 1:
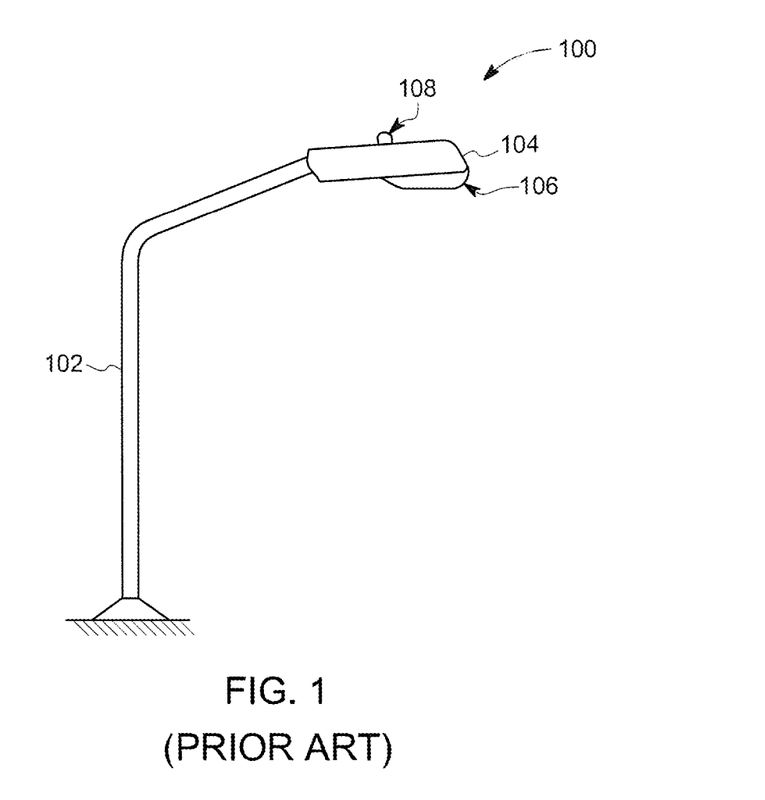
FIG. 1 illustrates a conventional outdoor lighting fixture.

FIG. 1 illustrates a conventional outdoor lighting fixture 100, which may be a highway or street light, or an area light, or another type of outdoor light fixture. The outdoor light fixture 100 includes a lamp post 102 (or lamp pole), a lamp head 104, and a light source 106. The outdoor light fixture 100 also typically includes an electronic device 108 that regulates the operation of the outdoor light fixture 100, which is installed into a "photoelectric eye" or "PE" receptacle (not shown) that is located on the top portion of the lamp head 104. The primary purpose of the PE receptacle or socket was to allow connection of a replaceable switch that is controlled by the sun in a manner to turn the street light ON and OFF automatically. The PE receptacle typically connects main power to the fixture, and thus if it is unplugged then the light fixture is powered off completely. Traditionally, the photoelectric eye or switch was the weak point in the overall design of outside street lamps, and thus was designed to make replacing a faulty switch easier to accomplish in the field (although a bucket truck was needed). Currently, in some cases the device 108 is a simple on/off component that includes an ambient light sensor (not shown) for regulating the day and night operation of the light source 106. However, in some other cases, the device 108 may include a plurality of sensors that provide more advanced features, such as light fixture power monitoring, light source dimming, and/or network data generating features.

Currently, electronic devices 108 are installed in the PE receptacle or socket of an outdoor lighting fixture 100 by human hand, by a person physically twisting the device 108 (using a twist/lock movement) to engage or disengage the power and communication connections between the device 108 and the PE receptacle. Such a twist/lock motion was designed for humans to perform, and thus requires a certain amount of torque. In addition, the person must be in proximity of the lamp head 104 of the outdoor lighting fixture 100 to perform such operations. Since such outdoor lighting fixtures 100 (for example, municipal street lamps or highway lights) typically include electronic devices 108 mounted on top of the lamp head 104 high above the ground (and thus are not easily accessible), a bucket truck is usually required in order to lift a person high enough and close enough to the lamp head 104 to remove and/or install a device 108 into the PE receptacle, or to make any other modifications that may be required. The cost of such operations involving bucket trucks, personnel, and sometimes employees to control traffic flow around the bucket trucks, often forms a large barrier to making any changes to an outdoor lighting fixture after its initial installation.

A flying or airborne drone could conceivably perform installation or removal of a device 108 connected to the PE receptacle of an outdoor light fixture 100 at a fraction of the cost associated with using a bucket truck, but such a drone would have to be specialized and/or modified to overcome the high torque and/or pressure issues encountered when removing or installing a device 108 into or out of a PE receptacle. In addition, it should be noted that each PE receptacle or socket has a variable resistance to insertion and removal (because not all of these sockets are exactly the same). Moreover, the process of precisely locating the device 108 into the PE receptacle so that a good electrical contact is made would be a big challenge for a flying drone. Thus, there is greater risk of failure of the installation or removal process if an airborne drone were to be utilized.

Yet another concern involves the likelihood of failure of the removal process or of an installation process, because in some cases a drone could be damaged or destroyed. Such an occurrence may incur costs greater than that of using a bucket truck to lift a person to manually install and/or remove a device. Moreover, any type of installation failure by use of an airborne drone would then require sending a repairman (or person) and a bucket truck to repair the partially-executed job of removal and/or insertion, which would further increase costs. For example, if a mature drone system designed for the task of removing and installing devices from conventional PE receptacles were to incur about a two percent failure rate, then potentially about one drone per day could be damaged or destroyed. Such a high drone loss and/or damage rate would be prohibitively expensive, for example, for a department of public works of a municipality to use drones in such manner.

Even in cases where the PE receptacle or socket is conducive to automation, wherein less torque or pressure is required for a flying drone to accomplish installation and/or removal, the drone must still be capable of performing a precision alignment procedure to ensure proper alignment and/or orientation of the device with the socket so that proper electrical contact(s) is/are made. Such operation would require a specialized and/or modified drone to perform the precision maneuvers needed to align with the socket (which may still have to be designed to overcome torque and/or pressure issues) and may require special training for human pilots of the drone, thus increasing expenses and/or costs.

Thus, it would be advantageous to provide a redesigned receptacle so that a conventional flying drone could perform a complete replacement of a device that is difficult to access, such as a device attached to the top of an outdoor light fixture.

BRIEF SUMMARY OF THE INVENTION

Presented are self-aligning connector assembly embodiments for a light fixture. In some embodiments, the self-aligning connector assembly includes a base and a self-aligning component. The base includes a first alignment feature extending from a platform and a first electrical contact, and the self-alignment component includes a second alignment feature and a second electrical contact. When the self-alignment component is positioned over and then released onto the base, the first alignment feature mates with the second alignment feature and causes rotation of the self-alignment component under the force of gravity, which results in operably connecting the first electrical contact to the second electrical contact.

Disclosed embodiments may include one or more of the following features. In some embodiments, the self-aligning connector assembly also includes an electronics component operably connected to the self-alignment component. The electronics component includes electrical circuitry operable to control the operation of a light fixture. In addition, the first alignment feature may include a central post having a bullet nose extending from the platform and may include a fin extending radially from the central post. The second alignment feature may include a sloped, peanut-shaped cavity formed about a central hole in the self-alignment component. In addition, the sloped, peanut shaped cavity may include a spiral angle of about fifteen degrees or may include a spiral angle of about thirty degrees, or may include a spiral angle of about forty-five degrees.

Disclosed embodiments of the self-alignment component may include at least one locking mechanism, and in some implementations the locking mechanism includes a locking flap configured to engage with a central post of the base. In addition, the locking mechanism further may include a locking handle connected to the locking flap and configured for disengaging the locking flap from the central post. In some implementations, the central post may include at least one notch configured for locking engagement with the locking flap.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

Reference now will be made in detail to illustrative embodiments, one or more examples of which are illustrated in the drawings. Like components and/or items in the various drawings are identified by the same reference number, and each example is provided by way of explanation only and thus does not limit the invention. In fact, it will be apparent to those skilled in the art that various modifications and/or variations can be made without departing from the scope and/or spirit of the invention. For instance, in many cases features illustrated or described as part of one embodiment can be used with another embodiment to yield a further embodiment. Thus, it is intended that the present disclosure covers such modifications and variations as come within the scope of the appended claims and their equivalents.

In general, and for the purpose of introducing concepts of embodiments of the present invention, apparatus and methods are described for facilitating the process of installing and/or replacing an electrical device that is affixed to a top portion of, for example, an outdoor light fixture (or affixed to some other device and/or in another position that is difficult to access). In some embodiments, a base affixed to the top of the outdoor light fixture includes a first alignment feature and a first electrical contact. A self-alignment component is provided that includes a second alignment feature and a second electrical contact. In some implementations, an electronics component, which could include one or more control circuits and/or sensors (such one or more light sensors and/or acoustic sensors), is physically and electrically coupled to the self-alignment component.

Thus, in some embodiments, a flying drone carries a payload that includes the self-alignment component and the attached electronics component into the air above a lamp head of an outdoor light fixture. The flying drone is then controlled (or piloted) to fly into a position over the lamp head and the base, and then to lower the self-alignment fixture onto the base such that the second alignment feature of the self-alignment component is hovering over and is generally aligned with the first alignment feature of the base. The flying drone then can be controlled to lower and release the self-alignment component (and attached electronics component) onto the base such that the second alignment feature contacts or mates with the first alignment feature of the base, which causes rotation of the self-alignment component (and attached electronics component) under the force of gravity in a downward direction. The self-alignment component (and attached electronics component) then rotates as it moves lower and comes to rest on a landing surface of a platform of the base and forms an electrical connection between the first electrical contact of the base and the second electrical contact of the self-alignment component. In addition, in some embodiments a locking feature of the self-alignment component engages with the first alignment feature (which may include a central post and/or fins of the base) to lock the self-alignment component (and attached electronics component) to the base.

The installation and/or replacement of electronic devices onto the lamp head of an outdoor light fixture using a flying drone and the self-aligning electrical connector in the manner described herein advantageously lowers installation and/or replacement costs as compared to conventional operations. As a result, the rate of replacement of such electronic components, for example, to install new and/or upgraded electronic features may drastically increase (due to the lower costs and ease of installation). For example, a bucket truck may be capable of replacing about five devices per hour in a city environment, whereas an airborne drone may be capable of easily replacing thirty to sixty such devices per hour on the lamp heads of outdoor lighting fixtures without requiring the use of expensive bucket trucks and/or without needing to impede traffic in the area. Accordingly, a larger percentage of outdoor lighting fixtures may advantageously be supplied with the latest technological innovations (ensconced within the electronics component), likely resulting in lighting performance enhancements and/or savings in electrical power costs, and the like.

Figure 2A:
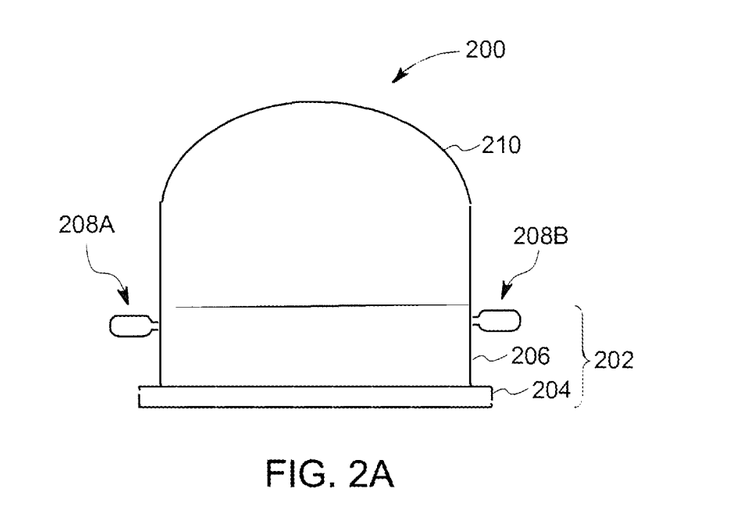
FIG. 2A is a side view of an example of a fully assembled electronic device including a self-aligning connector assembly in accordance with some embodiments of the disclosure.

FIG. 2A is a side view of an example of a fully assembled electronic device 200 that includes a self-aligning connector assembly 202 and an electronics component 210 in accordance with some embodiments. The assembled electronic device 200 could be attached to the top of an outdoor lighting fixture (not shown) and includes a self-aligning connector 202 that includes a generally circular base 204 and a generally circular self-alignment component 206. The base 204 has a bottom surface (not shown) configured for affixing to a top portion of an outdoor lighting fixture (for example, for attachment to the top of a lamp head of a municipal street lamp). The self-alignment component 206 includes a first locking mechanism 208A, a second locking mechanism 208B, and alignment features (not shown) which will be explained in more detail herein below. In some implementations, the first and second locking mechanisms 208A and 208B are levers and include portions (not shown) that function to lock the self-alignment component 206 to the base 204 until the levers are pressed in a downward direction, for example, by a drone to release the lock. Also shown is an electronics component 210 connected to the self-alignment component 206, wherein the electronics component 210 may include electrical circuitry and/or electrical components (such as control circuitry, not shown) housed therein that are operable to control the operation of the light fixture, for example, to regulate day and night operation of a light source (not shown) and/or regulate power consumption (for example, to dim the light source under some lighting conditions) of the outdoor light fixture. In some embodiments, the housing of the electronics component 210 can be designed to protect the internal electrical circuitry from conditions that may occur in the ambient environment, for example, in some embodiments the housing may be made of a material that is water proof and/or shock resistant and/or wind resistant.

Figure 2B:
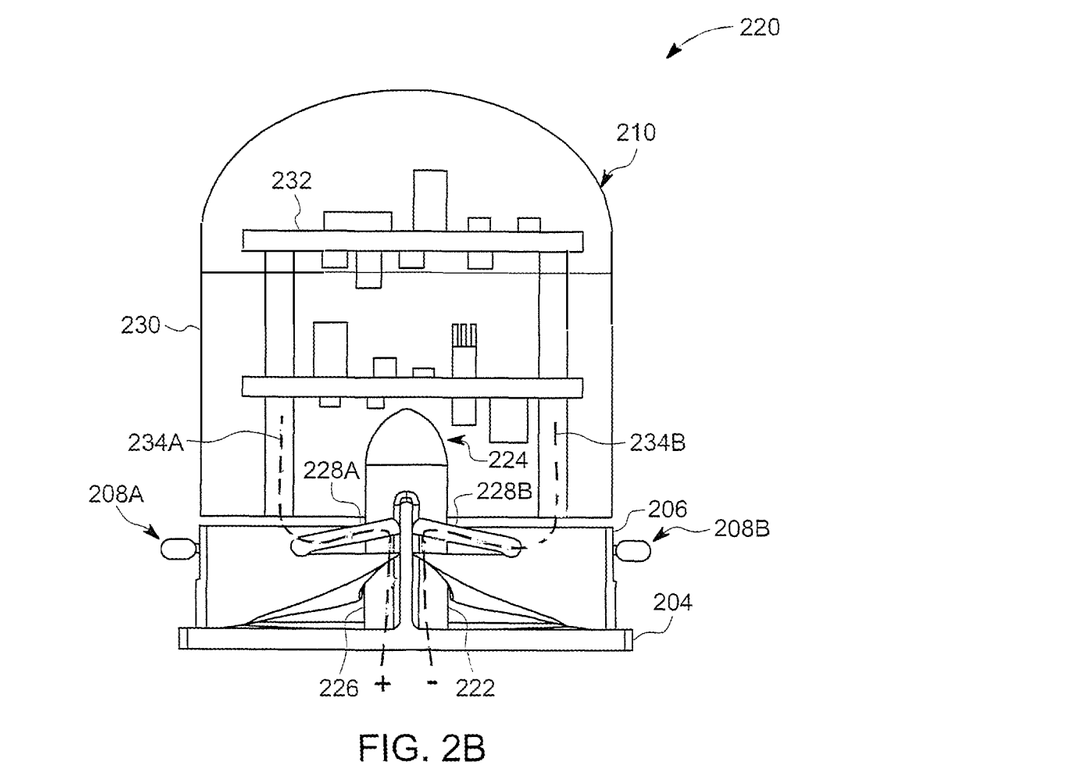
FIG. 2B is a cross-sectional view of the electronic device of FIG. 2A to illustrate internal aspects in accordance with some embodiments of the disclosure.

FIG. 2B is a cutaway side view 220 of the self-aligning connector and electronic device assembly 200 of FIG. 2A to illustrate internal aspects in accordance with some embodiments. The base 204 includes a central post 222 having a bullet nose 224 and two side fins (not shown) on either side of the central post 222. The self-alignment component 206 includes a circular central opening (not shown in FIG. 2B) and a sloped, peanut-shaped cavity 226 (which is an alignment feature) formed about the central opening. In the embodiment shown in FIG. 2B, the alignment component includes a first locking mechanism 208A and a second locking mechanism 208B. Each locking mechanism may include an arm portion (not shown), and the first locking mechanism includes a first locking flap 228A while the second locking mechanism includes a second locking flap 228B, which locking flaps are operable to engage with the fins and/or the central post 222 (which will be described in more detail herein) that protrude from the base to lock the alignment component (and attached electronics component) to the base. The locking mechanisms 208A and 208B are also configured to be unlocked by a drone when replacement of the electronics component is required, which will be explained in more detail herein below. It should also be noted that, while two locking mechanisms having a first locking flap 228A and a second locking flap 228B are shown, in some implementations a single-flap design can be implemented instead.

Referring again to FIG. 2B, also shown is an example of an electronics component 210 operably connected to and seated on the circular self-alignment component 206. As shown, the electronics component 210 includes a device housing 230 that can house various types of electronic circuitry 232. The housing 210 also includes a central hole or chamber or area configured to accommodate the bullet nose 224 and a portion of the central post 222 of the base 204. In this embodiment, examples of a first electrical current path 234A and a second electrical current path 234B are shown as dotted lines for the purposes of illustration. The electrical current paths 234A, 234B illustrate electrical pathways for connecting the electronic circuitry 232 of the electronics component 210 to a source of power (not shown) through the base 204 when the first locking flap 228A and the second locking flap 228B engage with the central post 222 of the base 204.

Figure 3A:
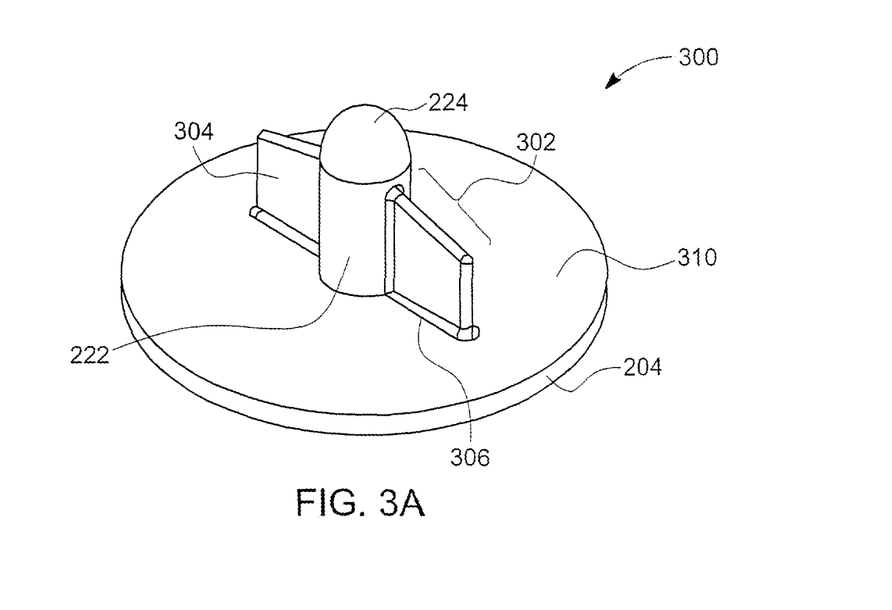
FIG. 3A is a top perspective view of a generally circular base in accordance with some embodiments of the disclosure.

FIG. 3A is a top perspective view 300 of a base 204 which is generally circular in accordance with some embodiments. The base 204 includes an alignment feature 302 that includes a central post 222 topped with a bullet nose 224, and a first fin 304 radially extended from, and which may be attached to, the central post 222. Also shown is a second fin 306 which also radially extends from, and may also be attached to, the central post 222. As shown, the alignment feature 302 protrudes upwardly from a landing surface 310 of the base 204, and the first and second fins 304, 306 extend radially from opposite sides of the central post 222.

Figure 3B:
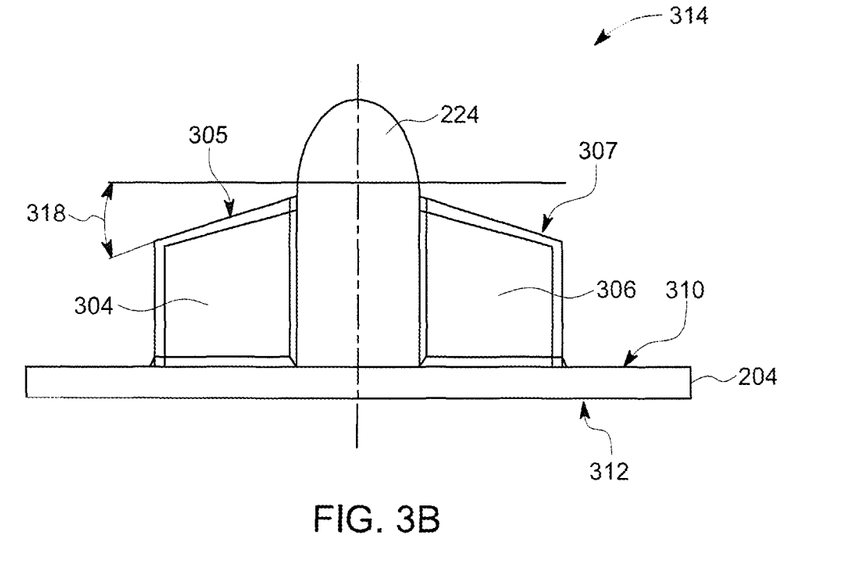
FIGS. 3B and 3C are side views of the generally circular base of FIG. 3A, wherein the side view of FIG. 3C is rotated ninety-degrees from the side view of FIG. 3B, in accordance with some embodiments of the disclosure.
Figure 3C:
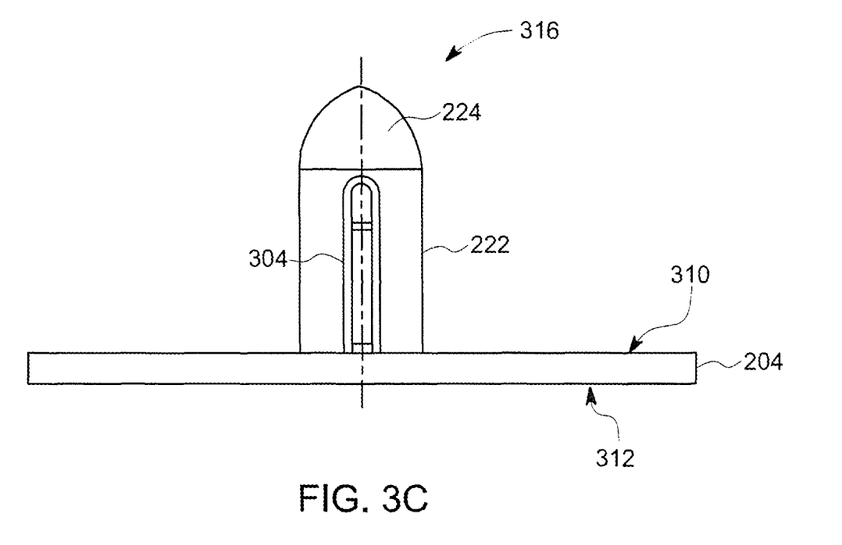

FIG. 3B is a side view 314 of the generally circular base 204 of FIG. 3A, and FIG. 3C is another side view 316 rotated ninety-degrees from the side view 314 in accordance with some embodiments. As shown, the first fin 304 has a sloped first leading edge 305 that has about a fifteen-degree slope 318 from the horizontal. The second fin 306, which is connected to an opposite side of the central post 222 from the first fin 304, has a second sloped leading edge 307 that also has about a fifteen-degree slope from the horizontal. As will be explained further herein below, the first sloped leading edge 305 and the second sloped leading edge 307 of the fins are configured for contacting a sloped, peanut-shaped cavity of the self-alignment component when the self-alignment component is lowered onto the base during an installation process. Referring again to FIG. 3B, in addition to the landing surface 310, the base 204 also includes a bottom surface 312 which can be configured for attachment to, for example, the top surface of a lamp head of an outdoor light fixture and the like.

Figure 4A:
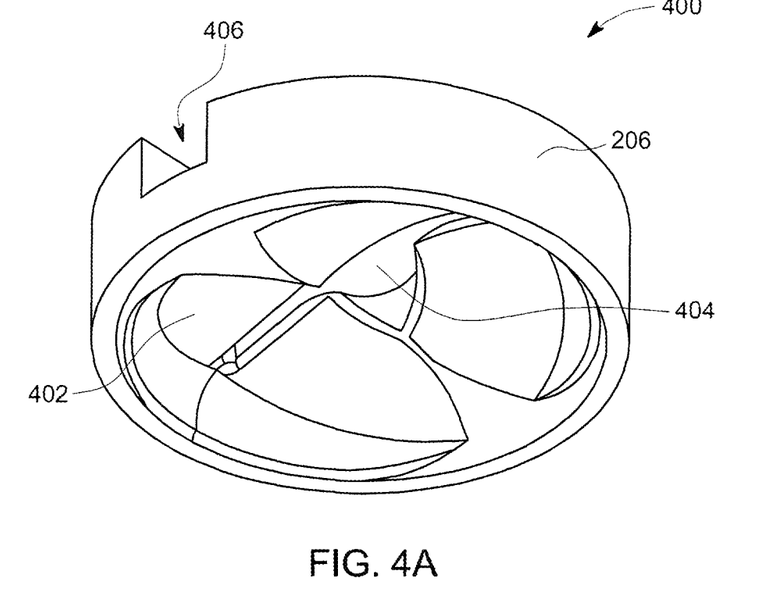
FIG. 4A is a bottom perspective view of a generally circular alignment component in accordance with some embodiments of the disclosure.

FIG. 4A is a bottom perspective view 400 of a self-alignment component 206 which has a generally circular shape in accordance with some embodiments. The self-alignment component 206 includes an alignment feature 402, which in some implementations is a sloped, peanut-shaped cavity formed about a central opening 404. Also shown in FIG. 4A is a locking mechanism channel 406 for a locking mechanism (not shown), which will be explained herein below.

Figure 4B:
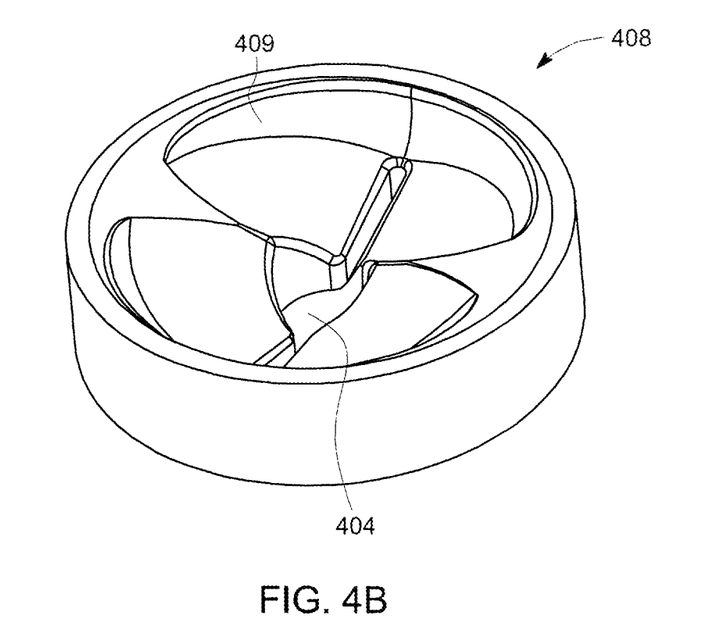
FIGS. 4B, 4C and 4D illustrate first, second and third bottom perspective views, respectively, of the alignment component to illustrate three different spiral angles for a sloped, peanut-shaped cavity (alignment feature) in accordance with some embodiments of the disclosure.
Figure 4C:
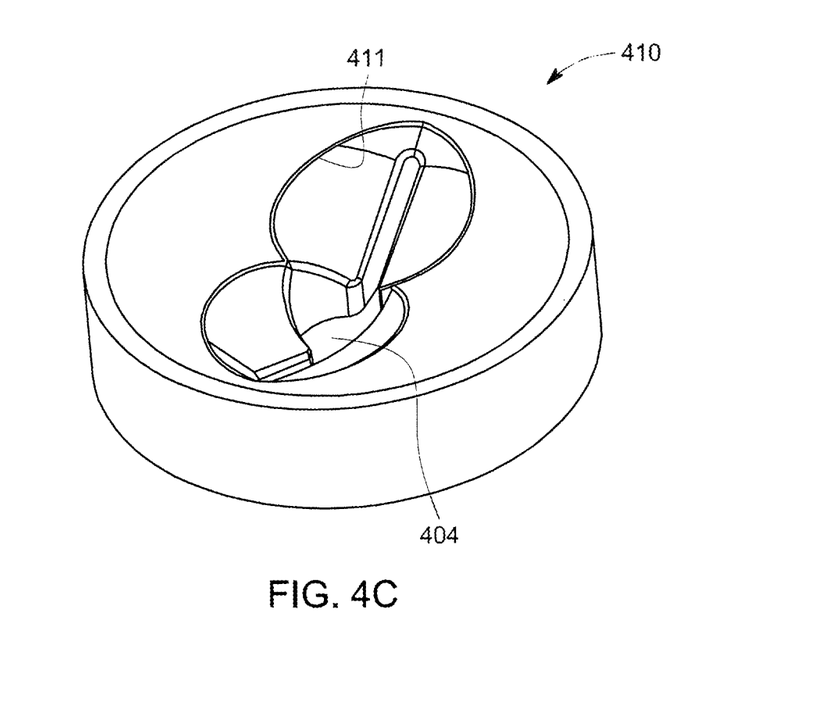
Figure 4D:
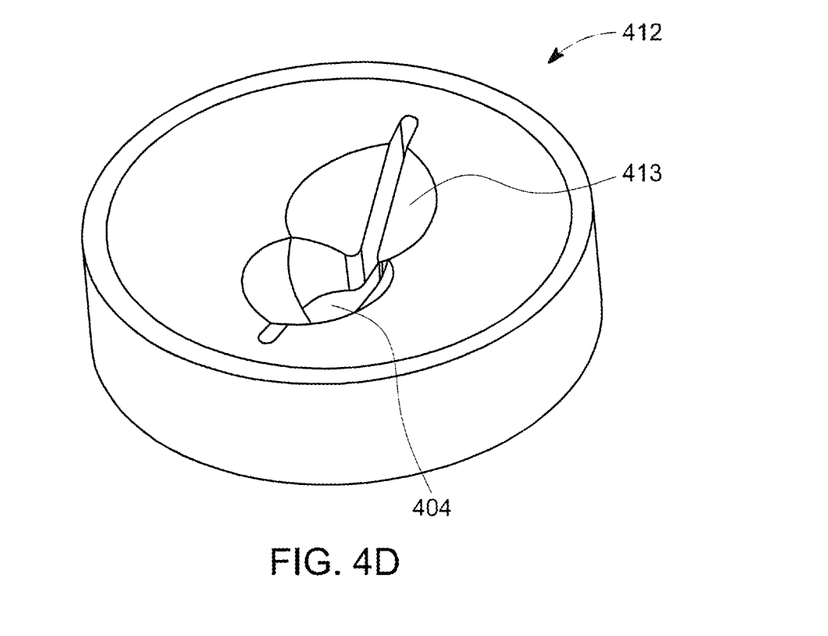

FIGS. 4B, 4C and 4D illustrate first, second and third bottom perspective views 408, 410 and 412, respectively, of three different self-alignment components which illustrate three different spiral angles for the sloped, peanut-shaped cavity (alignment feature) in accordance with some embodiments. In FIG. 4B, the first bottom perspective view 408 illustrates a sloped, peanut-shaped cavity 409 having a spiral angle of approximately fifteen-degrees, which provides a large capture area for capturing or contacting the bullet-shaped nose 224 of the central post 222 of the base 204 when the self-alignment component 206 is lowered onto the base during an electronics component installation or replacement operation. In the second bottom perspective 410 of the alignment component shown in FIG. 4C, the sloped, peanut-shaped cavity 411 has a spiral angle of approximately thirty-degrees, which provides a smaller capture area than the sloped, peanut-shaped cavity 409, but which provides better centering for the bullet-shaped nose 224 and the central post 222 of the base 204 when the self-alignment component 206 is lowered onto the base. In the third bottom perspective 412 of the alignment component shown in FIG. 4D, the alignment feature has a spiral angle of approximately forty-five degrees, which provides a sloped, peanut-shaped cavity 413 having a small capture area (as compared to the large capture area 409 of FIG. 4B, for example) for capturing or contacting the bullet-shaped nose 224 of the central post 222 of the base 204 when the self-alignment component 206 is lowered onto the base. However, the sloped, peanut-shaped cavity 413 of FIG. 4D provides better centering of the bullet-shaped nose 224 and the central post 222 of the base 204 when the self-alignment component 206 is lowered onto the base than the sloped, peanut-shaped cavities 411 or 409 of FIGS. 4B and 4C. It should be understood, however, that the spiral angles for the sloped, peanut-shaped cavity disclosed herein are intended only for the purposes of demonstrating the operational concept(s) and do not necessarily describe the best or ideal spiral angle for use as an alignment feature.

It should be noted that the fifteen-degree slope of the sloped, peanut-shaped cavity 409 shown in FIG. 4B matches the sloped leading edges 305 and 307 of the first and second fins, respectively, of the alignment feature 302 of the base as shown in FIG. 3B, so that the first and second fins make line contact with the moving or rotating alignment component. Such a match is advantageous because it allows for a line contact (instead of a point contact) between the parts, enabling a smooth motion that reduces the possibility of gouging or other damage occurring that could inhibit the automatic mating of the parts. Matching the angles in such manner is thus recommended to provide a smooth sliding motion when the self-alignment component 206 is lowered onto the base 204 during installation but is not entirely necessary for the success of the mating operation.

Figure 4E:
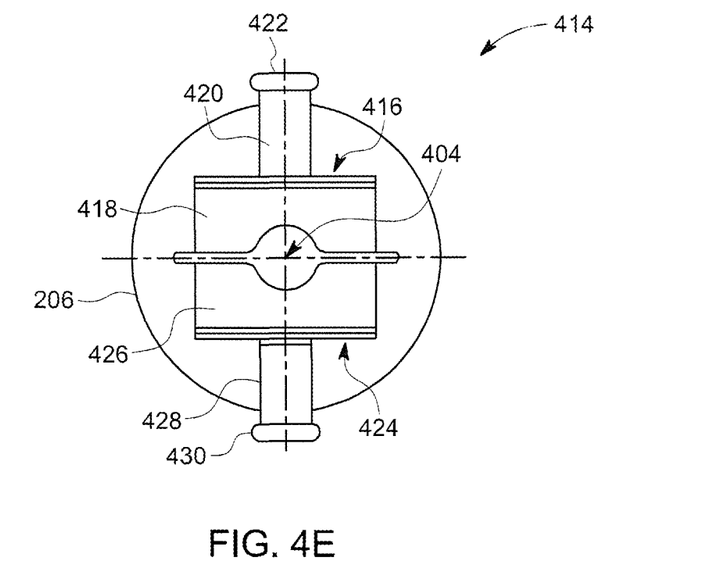
FIG. 4E is a top view top view of the alignment component of FIG. 4A in accordance with some embodiments of the disclosure.

FIG. 4E is a top view 414 of the self-alignment component 206 of FIG. 4A in accordance with some embodiments. In this configuration, a first locking mechanism 416 and second locking mechanism 424 are arranged around the central opening 404 of the self-alignment component 206. The first locking mechanism 416 includes a first locking flap 418 connected to a first locking arm 420 that terminates in a first locking handle 422. The first locking arm 420 rests within the locking mechanism channel 406 (see FIG. 4A) and is operable to lock (wedge) and unlock the first locking flap to/from a portion of the first and/or second fins 304, 306 and/or the central post 222 of the base, which will be explained in more detail herein below. Also shown in FIG. 4E is a second locking mechanism 424 which includes a second locking flap 426 connected to a second locking arm 428 that terminates in a second locking handle 430. During installation and/or removal of the alignment component, the second locking handle 430 is also operable to lock and/or unlock the second locking flap 426 to/from a portion of the first and/or second fins 304, 306 and/or the central post 222 of the base, which will be explained in more detail herein below. As mentioned herein, in some embodiments only one locking mechanism may be utilized instead of two.

Figure 4F:
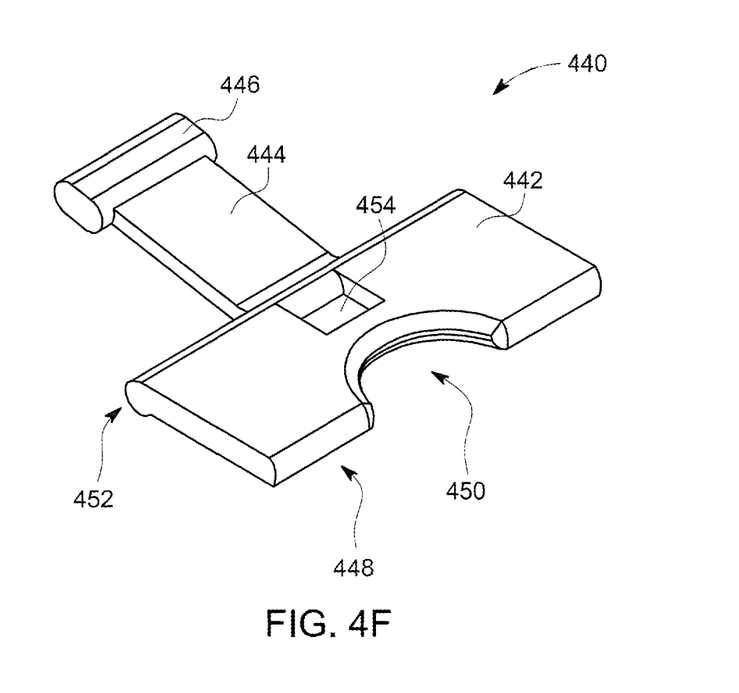
FIG. 4F is a perspective view of a locking mechanism of the alignment component in accordance with some embodiments of the disclosure.

FIG. 4F is a perspective view of a locking mechanism 440 in accordance with some embodiments. In some embodiments, the locking mechanism 440 includes a locking flap 442 connected to a locking arm 444 that terminates in a locking handle 446. The locking flap 442 includes a rounded leading edge 448 and a semi-circular cutout portion 450 for accommodating the bullet nose 224 and the central post 222 of the base 204 when the self-alignment component is being installed onto or removed from the base 204. Also shown is an elbow feature 452, which is the pivot point (or lever point) about which the locking flap 442 and locking arm 444 move when in operation. An opening 454 is also provided in some implementations for use, for example, to route one or more electric lines and/or connectors, such as wires, for providing an electrical connection between the electronics component 210 and the base 204.

Figure 4G:
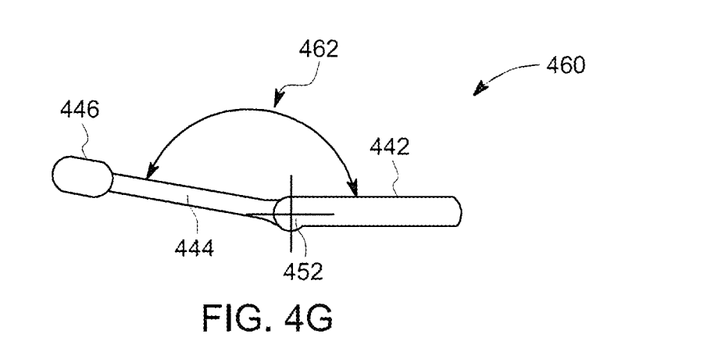
FIG. 4G is a side view of the locking mechanism of FIG. 4F in accordance with some embodiments of the disclosure.

FIG. 4G is a side view 460 of the locking mechanism 440 of FIG. 4F in accordance with some embodiments. In this illustrative embodiment, the plane of the locking flap 442 makes a one-hundred and seventy-degree angle 462 with the plane of the locking arm 444 about the elbow feature 452. The locking flap 442 is therefore not in the same plane as the locking arm 444, and it should be understood that other implementations could utilize other angles. Thus, in some implementations during installation when the locking flap engages with the fins and/or central post of the base 204 and locks, the handle 446 will be in an up position. Conversely, when replacement of the electronics component is to occur, a drone can be piloted to push the handle 446 in a downward direction (for example, as the drone lands on the lamp head of an outdoor light fixture) to a down position, which then forces the locking flap 442 to move in an upwards direction to disengage the leading edge 448 from the fins and/or from the central post of the base 204.

Figure 5:
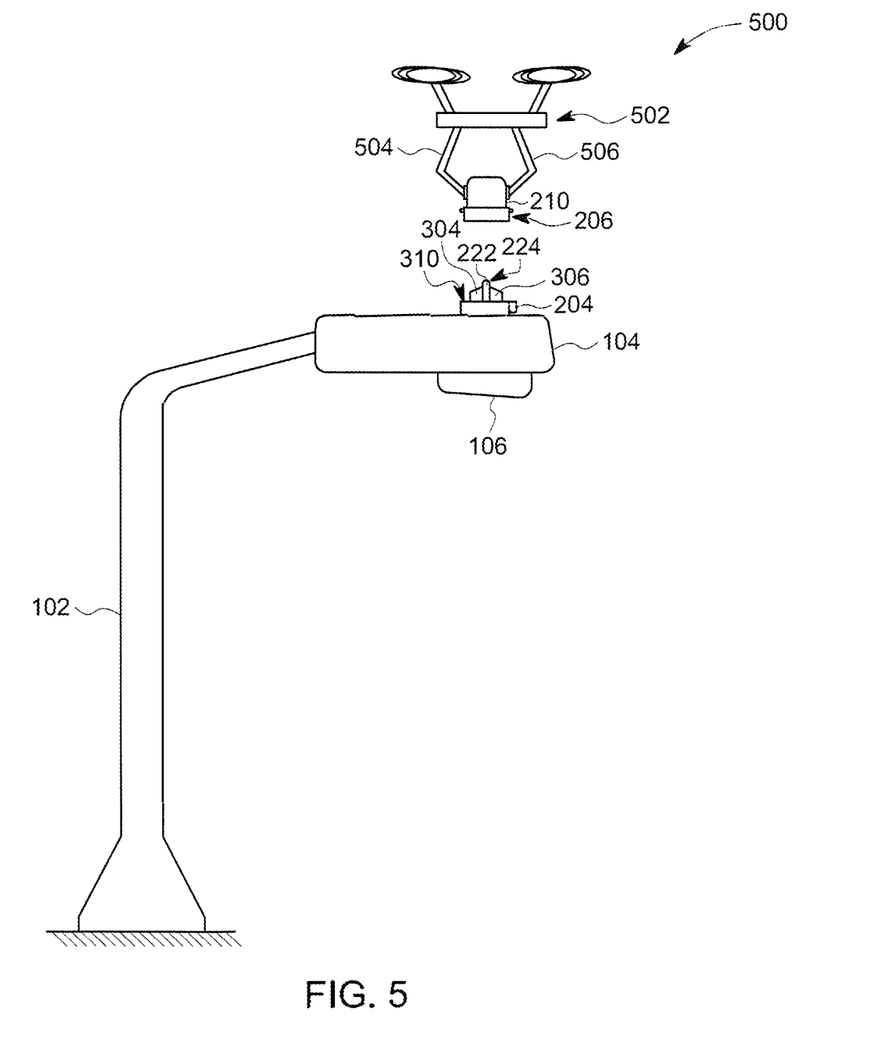
FIG. 5 shows an outdoor light fixture and drone to illustrate installation of an electronics component onto a lamp head of the outdoor light fixture in accordance with some embodiments of the disclosure.

FIG. 5 shows an outdoor light fixture and drone embodiment 500 to illustrate installation of an electronics component 210 onto a lamp head 104 of the outdoor light fixture in accordance with some embodiments. The outdoor light fixture includes a light source 106 connected to the lamp head 104 atop a lamp post 102, which may be, for example, a municipal street light. In this example, the base 204 of the self-aligning connector is already affixed to a top portion of the lamp head 104 and includes first and second fins 304 and 306 arranged about a central post 222 having a bullet nose 224 protruding upwardly.

Referring again to the implementation of FIG. 5, the drone 502 may be a quad copter or other type of remote-controlled flying device capable of lifting and of being controlled to maneuver the electronics component 210 and attached self-alignment component 206 over the bullet nose 224 of the base 204, as shown. The drone 502 may also include two or more arms 504, 506 operable to hold and to carry the electronics component 210 and attached self-alignment component 206 into position over the base, and when in the correct position, operable to release the electronics component 210 and attached self-alignment component 206. Thus, the drone 502 may include one or more cameras (not shown) capable of transmitted real time video pictures of the position of the electronics component 210 and attached self-alignment component 206 in relation to the base 204 to an operator (not shown), so that the drone operator can decide when to retract the arms 504 and 506 to release the self-alignment component and electronics device so that the peanut-shaped cavity (not shown) of the alignment component can contact the bullet nose 224 and fins 304 and 306 of the base, to cause rotation of the self-alignment component 206 and attached electronics component 210 as it moves downwards under the force of gravity until contact is made with the landing surface 310 of the base 204.

Figure 6A:
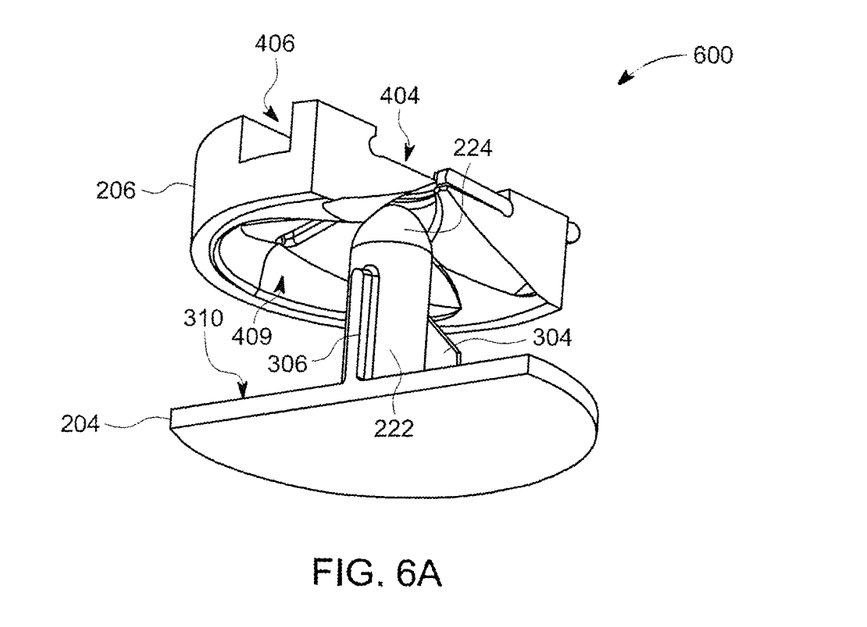
FIGS. 6A to 6G form a series of drawings that illustrate how an alignment component interacts with a base during an installation operation in accordance with some embodiments of the disclosure.
Figure 6B:
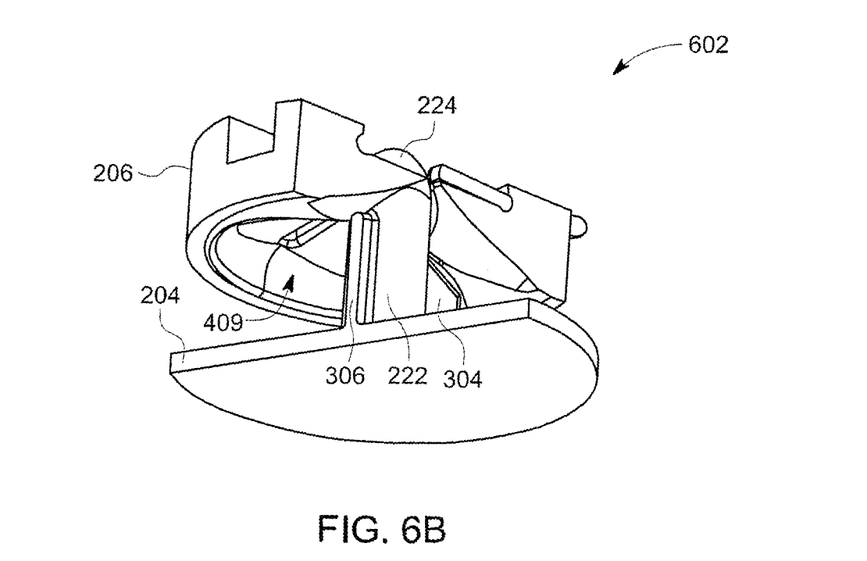
Figure 6C:
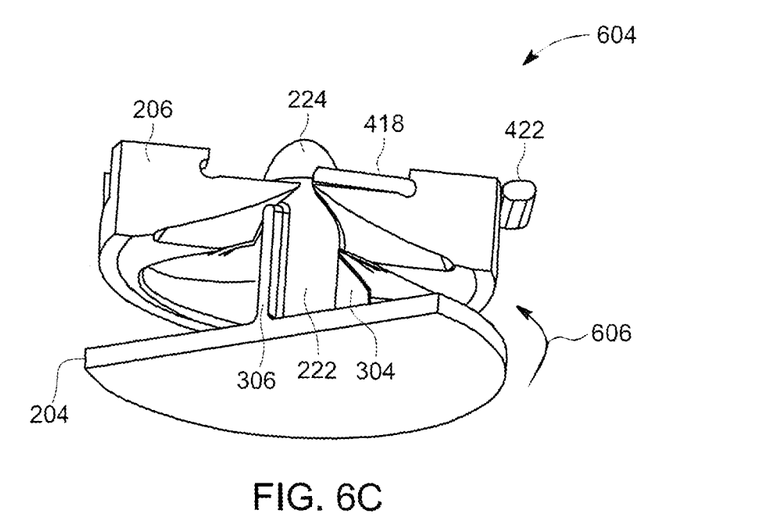

FIGS. 6A to 6G form a series of drawings for illustrating how a self-alignment component 206 interacts with a base 204 during an installation operation in accordance with some embodiments. It should be understood that FIGS. 6A to 6C depict cutaway bottom perspective views, whereas FIGS. 6D to 6G depict side views, of a self-alignment component 206 and base 204 which have some features redacted and/or omitted for ease of understanding.

FIG. 6A depicts a cutaway perspective view of a self-alignment component 206 and a cutaway perspective view of a base 204 in an initial engagement position 600. As shown, the base 204 includes a central post with a bullet nose 224, a fin 304 protruding upwardly from the landing surface 310, and a cutaway section of the fin 306 (opposite fin 304). The self-alignment component 206 includes a peanut-shaped cavity 409 with a fifteen-degree spiral angle formed about a central opening 404. In this initial engagement position, the bullet nose 224 is pointed in the general direction of the opening 404 of the self-alignment component 206.

FIG. 6B depicts a first contact position 602, wherein the self-alignment component 206 is slightly lower than in FIG. 6A. In the first contact position 602, the bullet nose 224 has penetrated the opening 404 in the self-alignment component 206, and the peanut-shaped cavity 409 (having a fifteen-degree spiral angle) of the self-alignment component 206 is just starting to contact the fin 304 of the base (and would also be starting to contact the fin 306, which is not shown in FIGS. 6A-6G). In this position 602, the bullet nose 224 and parts of a first locking mechanism 416 can be seen, such as the first locking flap 418 and the first locking handle 422.

Figure 6D:
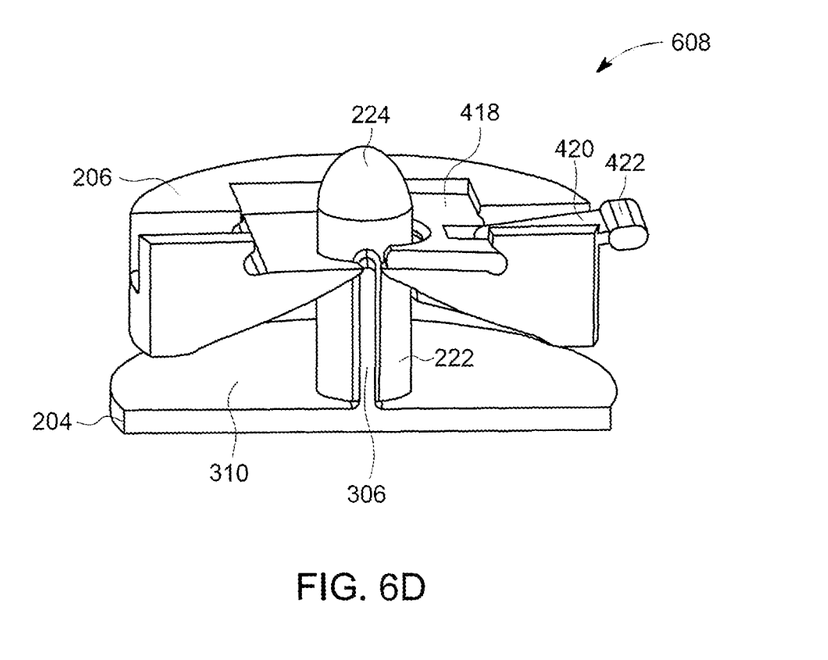
Figure 6E:
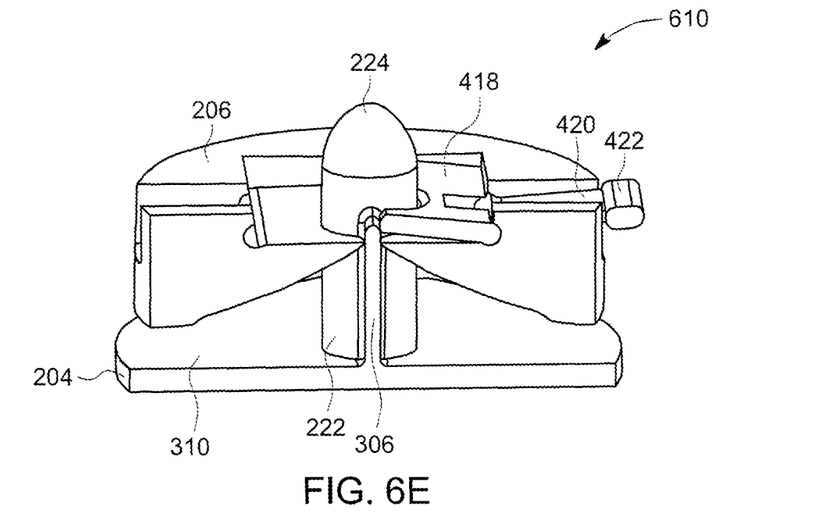
Figure 6F:
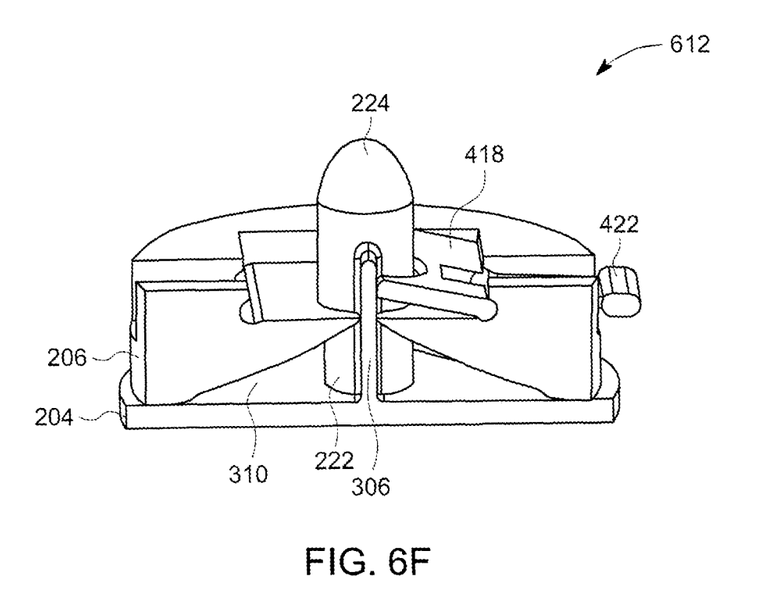
Figure 6G:
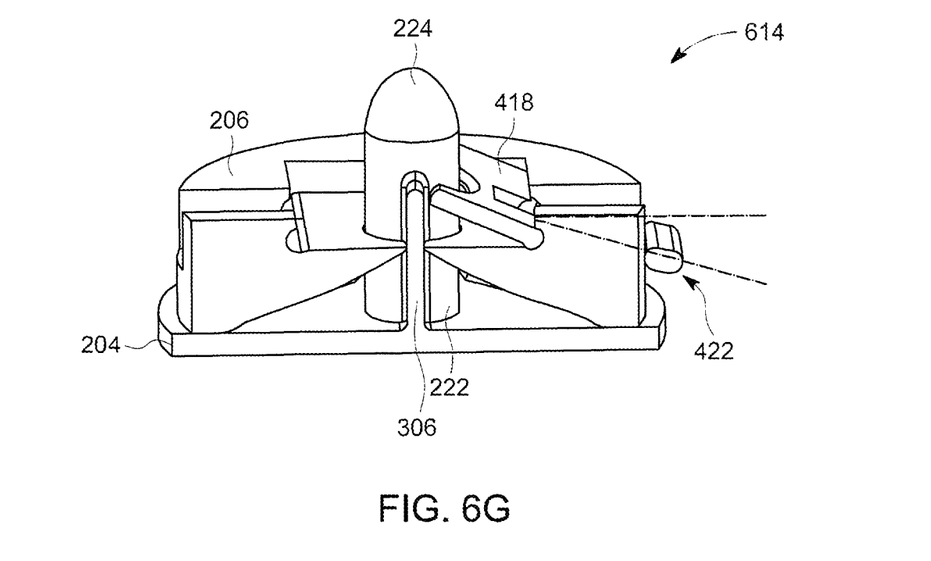

FIG. 6C illustrates a rotation position 604, wherein the self-alignment component 206 is beginning to rotate in a counterclockwise direction (in the direction of arrow 606) as the fin 304 (and second fin 306, not shown) rides along the spiral angle of the peanut-shaped cavity 409 of the self-alignment component 206. In FIG. 6D, the self-alignment component 206 is in an alignment position 608 wherein rotation has ended and the fins 304 and 306 of the base 204 are aligned with slots formed in the self-alignment component 206. Thus, FIG. 6E depicts an initial locking position 610 wherein the locking flap 418 is beginning to contact the fins 304 and 306 to move the locking flap 418 into a locked position as the self-alignment component 206 is continuing to move downward towards the landing surface 310 of the base 204. FIG. 6F illustrates a fully seated and locked position 612 wherein a bottom surface of the self-alignment component 206 contacts the landing surface 310 of the base, and wherein the locking flap 418 is contacting the fins 304 and 306 of the base 204. Thus, the locking flap 418 is configured to be heavier than the locking arm (not shown) and the locking handle 420 so that it will wedge itself of jam itself into the locking fins to prevent disengagement of the self-alignment component 206 and base 204 from each other. In other embodiments, the locking flap 418 may be forced downward by one or more springs or other mechanical devices (not shown) instead of by its own weight. However, FIG. 6G depicts an initial disengagement position 614 wherein the locking handle 420 is depressed in a downward direction (which can occur, for example, when a drone lands on the locking handle 422) which lifts the locking flap 418 away from the fins 304 and 306 and the central post 222 to unlock the self-alignment component 206 from the base 204.

Figure 7A:
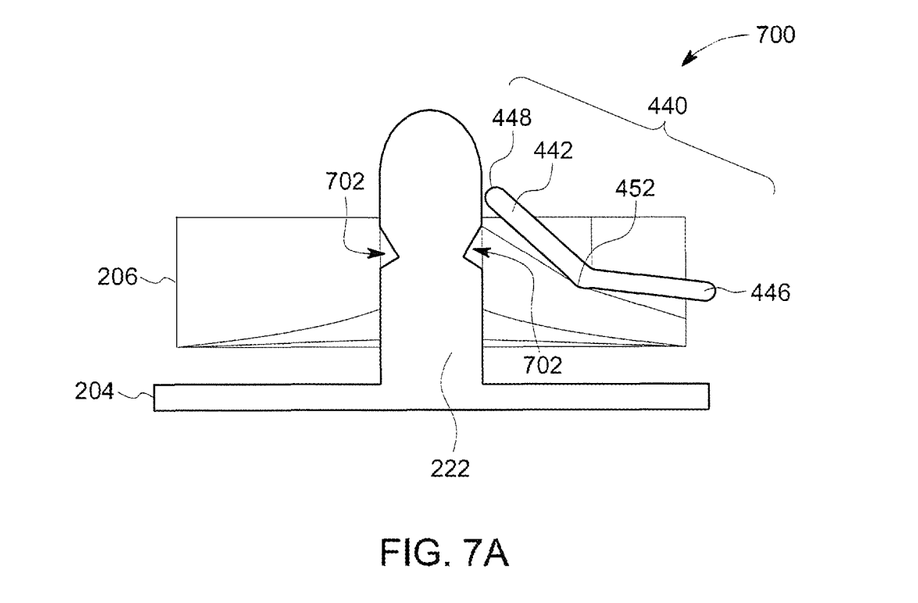
FIGS. 7A and 7B illustrate an example of a locking design in accordance with some embodiments.
Figure 7B:
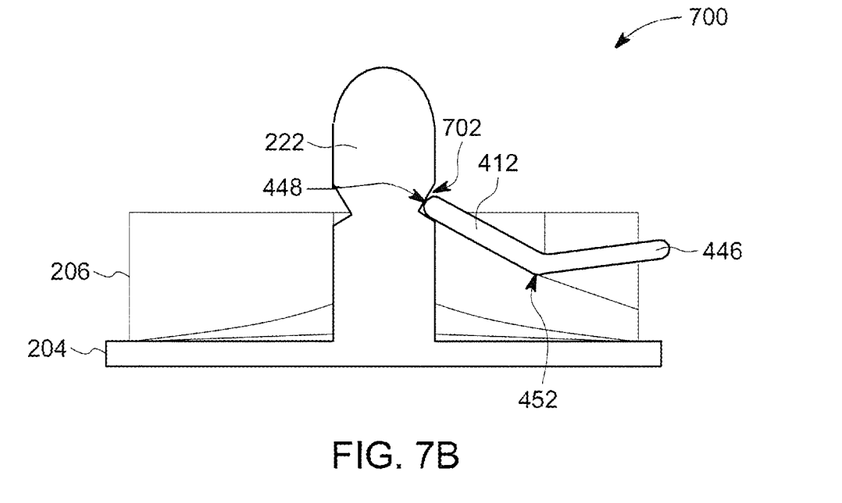

FIGS. 7A and 7B illustrate an example of a locking design 700 in accordance with some embodiments. In both FIGS. 7A and 7B, simplified cutaway side views of a base 204 and self-alignment component 206 are shown for ease of understanding. Referring to FIG. 7A, a central post 222 of the base 204 includes a notch 702, which is some embodiments is located about the entire circumference of the central post 222. The notch 702 is strategically positioned and sized to accept the leading edge 448 of a locking flap 442. In FIG. 7A, the locking mechanism 440 is in an unlocked position, wherein the leading edge 448 of the locking flap 442 is resting on the central post 222 above the notch 702, and the locking handle 446 is in an unlocked or down position. Referring now to FIG. 7B, during installation as the self-alignment component 206 moves in a downward position to come to rest on the platform of the base 204, the locking mechanism 440 pivots about the elbow feature 452 when the leading edge 448 of the locking flap 442 moves into the notch 702, and the locking handle 446 moves upward into a locked or upward position. Thus, FIG. 7B shows the self-alignment component 206 locked into the base 204 as the leading edge 448 is fully engaged with the notch 702. Using a notch 702 as the locking mechanism advantageously provides a physical interference between the base and self-alignment components that cannot be separated without damaging these components, which is preferable to relying on friction alone to keep the locking flap in a locked position.

Figure 8:
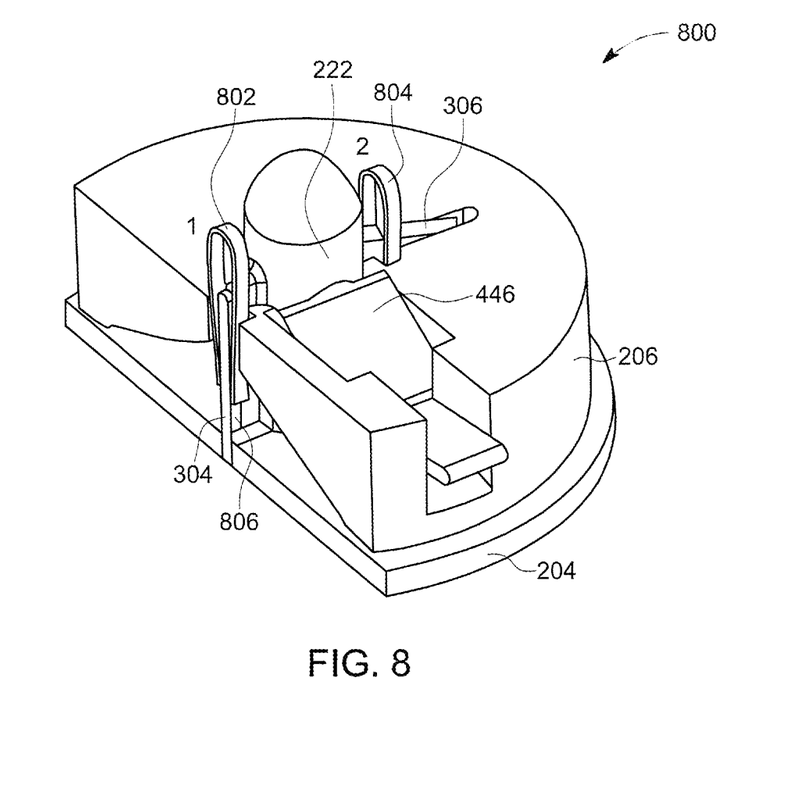
FIG. 8 is a top perspective cutaway view of a self-aligning connector assembly illustrating an electrical connection in accordance with some embodiments.

FIG. 8 is a top perspective cutaway view of a self-aligning connector assembly 800 illustrating an electrical connection in accordance with some embodiments. A locking flap 446 of the self-alignment component 206 is shown engaged with a notch on the central post 222 of the base 204. The self-alignment component 206 includes a first electrical clip connector 802 and a second electrical clip connector 804, which are both connected to electronic circuitry of an associated electronics component (not shown). The first electrical clip connector 802 and the second electrical clip connector 804 are also configured for connection to electronic connectors associated with the base in order to provide power to the electronics component during operations.

Referring again to FIG. 8, the first electrical clip connector 802 is shown operably connected to a first electrically conductive strip 806 that is positioned on a first fin 304 associated with the base 204, and the second electrical clip 804 is operably connected to a second electrically conductive strip (not shown) that is positioned on a second fin 306. In this manner, good electrical contact is made between the base 204 (which supplies power) and the self-alignment component 206 and associated electronic component when installation occurs. It should be understood that many different variations of such an electrical connection can be utilized, which may be established on the fins 304, 306 as illustrated, or which may be established in other locations on the base 204. In addition, the placement and/or physical layout of the electrical connector components may depend upon how many electrical contacts are needed and whether or not such electrical connections can be symmetrically laid out. For example, a direct current (DC) electrical connection would be orientation dependent, whereas an alternating current (AC) connection would not be orientation dependent.

The above descriptions and/or the accompanying drawings are not meant to imply a fixed order or sequence of steps for any process or method of manufacture referred to herein. Thus, any disclosed process may be performed in any order that is practicable, including but not limited to simultaneous performance of one or more steps that are indicated as sequential.

Although the present invention has been described in connection with specific exemplary embodiments, various changes, substitutions, modifications and/or alterations apparent to those skilled in the art can be made to the disclosed voice activated lighting apparatus and/or voice activated lamp system embodiments without departing from the spirit and scope of the invention as set forth in the appended claims.

What is claimed is:

1. A self-aligning connector assembly for a light fixture comprising:
    a base comprising a first alignment feature including a first fin extending from a platform and extending radially from a central post and a first electrical contact; and
    a self-alignment component comprising a second alignment feature including a cavity defining a spiral angle, and a second electrical contact;
    wherein when the self-alignment component is positioned over and then released onto the base, the first alignment feature mates with the second alignment feature which causes rotation of the self-alignment component about the central post under the force of gravity, resulting in operably connecting the first electrical contact to the second electrical contact.

2. The apparatus of claim 1, further comprising an electronics component operably connected to the self-alignment component.

3. The apparatus of claim 2, wherein the electronics component comprises electrical circuitry operable to control the operation of a light fixture.

4. The apparatus of claim 1, wherein the central post has a bullet shaped nose extending from the platform.

5. The apparatus of claim 4, wherein the first fin and a second fin extend radially from opposite sides of the central post.

6. The apparatus of claim 1, wherein the second alignment feature comprises a sloped cavity is peanut-shaped and formed about a central hole in the self-alignment component.

7. The apparatus of claim 6, wherein the sloped, peanut shaped cavity comprises the spiral angle of about fifteen degrees.

8. The apparatus of claim 6, wherein the sloped, peanut shaped cavity comprises the spiral angle of about thirty degrees.

9. The apparatus of claim 6, wherein the sloped, peanut shaped cavity comprises the spiral angle of about forty-five degrees.

10. The apparatus of claim 6, wherein the second alignment feature further comprises at least one slot in the peanut-shaped cavity for mating with the first fin extending from the platform of the base.

11. The apparatus of claim 1, wherein the self-alignment component further comprises at least one locking mechanism.

12. The apparatus of claim 8, wherein the at least one locking mechanism comprises a locking flap configured to engage with the central post of the base.

13. The apparatus of claim 12, wherein the at least one locking mechanism further comprises a locking handle connected to the locking flap and configured for disengaging the locking flap from the central post.

14. The apparatus of claim 12, wherein the central post further comprises at least one notch configured for locking engagement with the locking flap.

15. The apparatus of claim 1, wherein the light fixture comprises an outdoor light fixture comprising a lamp head connected to a lamp post, and wherein the base is affixed on a top portion of the lamp head.

16. The apparatus of claim 1, wherein the base and the self-alignment component are generally circular.

17. A self-aligning connector assembly comprising:
    a base comprising a first alignment feature including a first fin extending from a platform and extending radially from a central post and a first electrical contact; and
    a self-alignment component comprising a second alignment feature including a cavity defining a spiral angle, and a second electrical contact;
    wherein when the self-alignment component is positioned over and then released onto the base, the first alignment feature mates with the second alignment feature which causes rotation of the self-alignment component about the central post under the force of gravity, resulting in operably connecting the first electrical contact to the second electrical contact.

* * * * *